United States Patent [19]

Klein Gunnewiek et al.

[11] Patent Number: 5,757,434
[45] Date of Patent: *May 26, 1998

[54] MOTION-COMPENSATED PREDICTIVE ENCODER IN WHICH GROUPS OF PICTURES ARE EACH ENCODED WITH SUBSTANTIALLY THE SAME NUMBER OF BITS

[75] Inventors: Reinier B. M. Klein Gunnewiek, Eindhoven, Netherlands; Imran A. Shah, Ossining, N.Y.; Gerrit J. Keesman, Eindhoven, Netherlands

[73] Assignee: U.S. Philips Corporation, New York, N.Y.

[*] Notice: The term of this patent shall not extend beyond the expiration date of Pat. No. 5,606,371.

[21] Appl. No.: 346,941

[22] Filed: Nov. 29, 1994

[30] Foreign Application Priority Data

Nov. 30, 1993 [BE] Belgium .............................. 09301321

[51] Int. Cl.⁶ .................................................. H04N 7/30
[52] U.S. Cl. .......................... 348/405; 348/419; 382/251
[58] Field of Search ............................... 348/405, 409, 348/411, 419, 423; 382/251

[56] References Cited

U.S. PATENT DOCUMENTS

| | | | |
|---|---|---|---|
| 5,038,209 | 8/1991 | Hang | 348/419 |
| 5,144,424 | 9/1992 | Savatier | 348/419 |
| 5,231,484 | 7/1993 | Gonzales et al. | |
| 5,241,383 | 8/1993 | Chen et al. | 348/405 |
| 5,291,281 | 3/1994 | Paik et al. | |
| 5,410,351 | 4/1995 | Kojima | 348/401 |
| 5,426,463 | 6/1995 | Reininger | 348/405 |
| 5,442,401 | 8/1995 | Murakami et al. | 348/405 |
| 5,506,623 | 4/1996 | Sako et al. | 348/405 |
| 5,532,745 | 7/1996 | Senda | 348/405 |
| 5,543,844 | 8/1996 | Mita et al. | 348/405 |
| 5,585,853 | 12/1996 | Juri et al. | 348/405 |
| 5,606,371 | 2/1997 | Gunnewiek et al. | 348/405 |

FOREIGN PATENT DOCUMENTS

| | | |
|---|---|---|
| 0540961 | 10/1992 | European Pat. Off. . |
| 0541302 | 10/1992 | European Pat. Off. . |
| 0574724 | 5/1993 | European Pat. Off. . |

OTHER PUBLICATIONS

"Hardware Implementation of the Framestore and Datarate Control for a Digital HDTV–VCR", a discourse held at the HDTV Symposium, in Japan, Nov. 1992.

"Coding of moving pictures and associated audio for digital storage media up to about 1.5 Mbit/s", ISO/IEC IS 11172.

*Primary Examiner*—Tommy P. Chin
*Assistant Examiner*—Anand S. Rao
*Attorney, Agent, or Firm*—Laurie E. Gathman

[57] ABSTRACT

A device comprising an MPEG encoder (2) is provided with a preanalyser (8) which encodes each picture with a fixed step size ($Q_2$). The preanalyser is coupled to a computing circuit (9) which computes, for each type of (I, P, B) picture, a target value (T) for the number of bits for encoding said picture, as well as a suitable distribution of the target value among the macroblocks of the picture. A proportionally integrating control circuit (7) controls the quantization step size ($Q_1$). Since the PI control circuit does not introduce any residual errors, the desired number of bits per picture or per group of pictures is achieved within narrow limits. The output signal is eminently suitable for recording and subsequent editing.

7 Claims, 3 Drawing Sheets

MOTION-COMPENSATED PREDICTIVE ENCODER IN WHICH GROUPS OF PICTURES ARE EACH ENCODED WITH SUBSTANTIALLY THE SAME NUMBER OF BITS

BACKGROUND OF THE INVENTION

1. Field of the Invention

The invention relates to a device for encoding a video signal. More particularly, the invention relates to a device for encoding groups of pictures, some pictures of which are subjected to independent encoding and other pictures are subjected to motion-compensated predictive encoding.

2. Description of the Related Art

A device of the type described in the opening paragraph is known by the name of MPEG encoder and is described, inter alia in "Coding of moving pictures and associated audio for digital storage media up to about 1.5 Mbit/s", ISO/IEC IS 11172 and, more particularly, in "MPEG 2 Test Model 5", ISO/IEC JTC1/SC29/WG11/N0400, April 1993.

The known device for encoding video signals comprises means for dividing each picture into a plurality of sub-pictures, and an encoder comprising a picture transformer for transforming each sub-picture into coefficients, and a quantizer for quantizing the coefficients with an applied step size. Either individual pictures or motion-compensated differential pictures are applied to the encoder. At least one picture of a group of pictures (GOP) is intraframe (i.e. independently) encoded. Such a picture is referred to as an I picture. Other pictures are subjected to motion-compensated interframe (i.e. predictive) encoding. In forward prediction the term P pictures is sometimes used, in bidirectional prediction the term B pictures is sometimes used. A frequently occurring division of a GOP is, for example the series "IBBPBBPBBPBB".

Moreover, the device comprises control means for controlling the step size in conformity with a target value for the number of bits for encoding the applied picture. The control means have for their object to obtain a constant bitrate, in spite of the enormous spread in the number of bits produced for the separate pictures. In order to generate, on average, a constant number of bits per GOP, the document MPEG 2 Test Model 5 states that the known device computes a target value for the number of bits for each picture in dependence upon the complexity of this picture. Said complexity is fixed with reference to the encoding results of the previous picture of the same type (I, P, B). This previous picture may, however, be relatively old. For example, the previous I picture in the GOP "IBBPBBPBBPBB" is always situated 12 pictures back in time. The known device comprises slowly controlling control means for maintaining the average bitrate constant, in spite of the temporal changes to which the complexity of pictures is subject. This causes large fluctuations in the number of bits per GOP. The known device is not suitable for producing a bit stream for recording because editing of recorded signals and display at different speeds requires a constant number of bits per at least an integral number of pictures.

SUMMARY OF THE INVENTION

It is an object of the invention to obviate the above-mentioned drawbacks.

According to the invention, the device comprises an additional encoder for encoding the applied picture in response to a fixed step size, and computing means for computing the target value from the picture thus encoded in dependence upon the type of (I, P, B) picture. It is thereby achieved that the complexity of the current picture is now taken into account for computing the target value. This reduces the fluctuations of the number of bits per GOP to a considerable extent.

It is to be noted that the use of an additional encoder having a fixed step size is known per se from "Hardware Implementation of the Framestore and Datarate Control for a Digital HDTV-VCR", a discourse held at the HDTV Symposium in Japan, November 1992. However, this publication relates to intraframe encoding of a signal, so that only I pictures are obtained. The additional encoder only determines the relative distribution of the number of bits in the I picture and is not coupled to computing means for computing the target value (with full intraframe encoding, the target value for all pictures is equal and known in advance).

The fixed step size which is applied to the additional encoder may be constituted by the average step size with which the previous P picture has been encoded. Particularly realistic target values for each type of picture are obtained if the fixed step size is constituted by the average step size with which a previous picture of the same type (I, P, B) has been encoded.

In a favourable embodiment of the device, the computing means comprise a distribution circuit for distributing the computed target value among the sub-pictures of a picture in proportion to the number of bits generated for these sub-pictures by the additional encoder. The control means are adapted to control the step size in response to the local target value for each sub-picture. In this way a profile is obtained of the need of bits for the sub-pictures. For example, a picture comprising, from top to bottom, a clear blue sky, terrace houses and a very detailed flowerbed, can be optimally encoded because the distribution circuit "foresees" that more bits are spent on sub-pictures as they are more detailed and more difficult to encode. Thus, a uniform distribution of picture quality in a picture is obtained.

The bit stream produced by the device not only comprises coefficient data but also quantization-independent information. The MPEG syntax comprises, inter alia, motion vectors of a block and control bits indicating whether a bit series is produced by intraframe or interframe encoding of the block. For some sub-pictures, the bits required for this "overhead" may constitute a considerable fraction of the number of bits with which this sub-picture is transmitted. To prevent the target value for a sub-picture from being spent to a considerable extent on overhead bits, the computing means comprise a distribution circuit for distributing the target value among the sub-pictures in proportion to the number of quantization-dependent bits generated for these sub-pictures by the additional encoder. In this way an even better distribution of picture quality in a picture is obtained.

In a very favourable embodiment of the device, the control means are constituted by means for forming a control signal which is representative of the difference between the cumulative target values for each sub-picture and the number of bits produced by the encoder. The control signal thus formed is applied to a proportionally integrating control circuit. Such a circuit does not introduce any statistic errors, so that the number of bits per GOP is constant within narrow limits. A bit stream obtained by means of this embodiment is eminently suitable for recording and subsequent editing and display at different speeds.

BRIEF DESCRIPTION OF THE DRAWINGS

These and other aspects of the invention will be apparent from and elucidated with reference to the embodiments described hereinafter.

In the drawings

DESCRIPTION OF THE PREFERRED EMBODIMENTS

Figure 1:
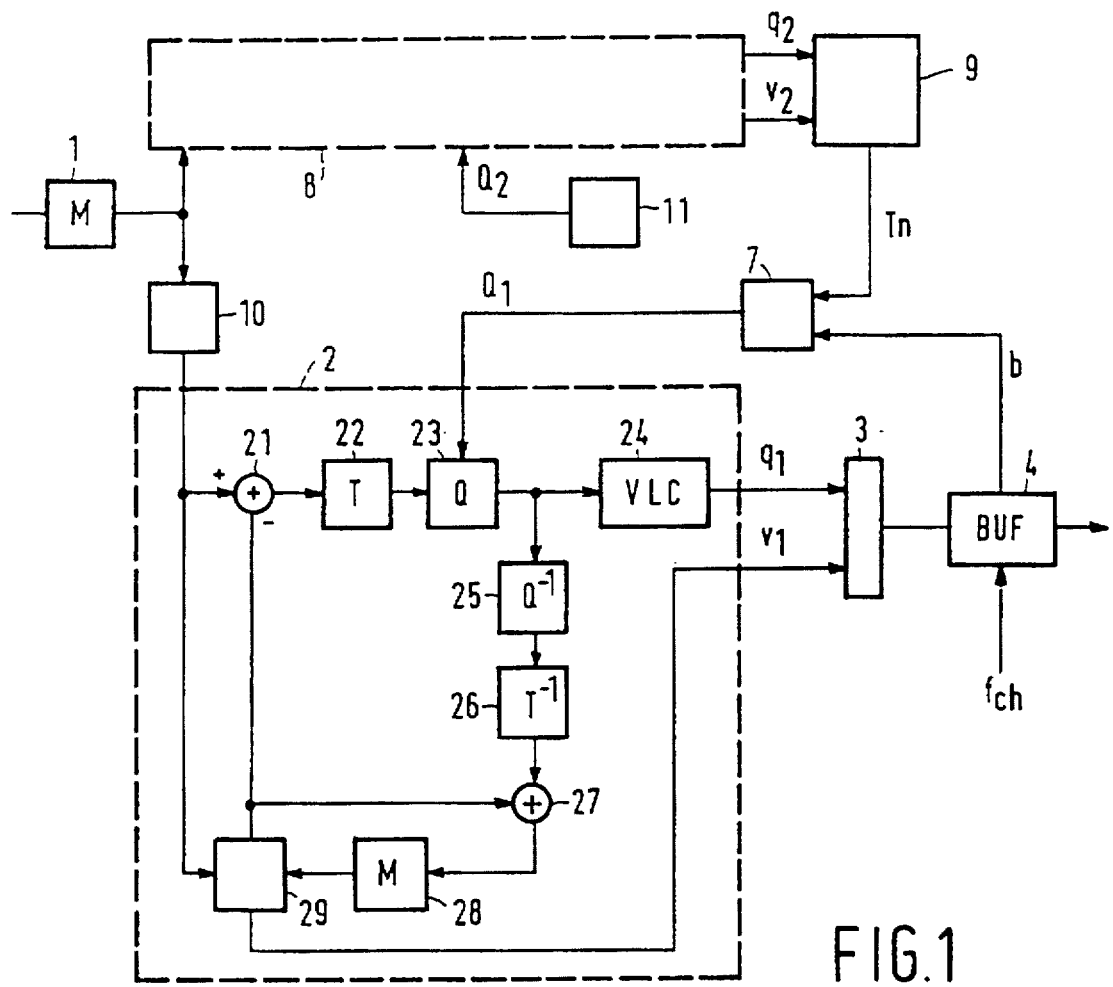
FIG. 1 shows a device for encoding a video signal according to the invention.

FIG. 1 shows a device for encoding a video signal according to the invention. The device comprises a memory 1 in which each picture is split into blocks of, for example 8*8 pixels. A predetermined number of contiguous blocks, for example four blocks of 8*8 luminance samples and two blocks of 8*8 chrominance samples, constitute a subpicture. In conformity with the conventional MPEG syntax, such a sub-picture will hereinafter also be referred to as macroblock.

The blocks of 8*8 samples are applied to an encoder 2 via a picture delay 10. This encoder comprises a subtracter circuit 21, a picture transformer 22 for transforming each block into 8*8 coefficients, a quantizer 23 for quantizing the coefficients with a step size $Q_1$ and a variable-length encoder 24 for encoding the quantized coefficients into code words of variable length. The encoder further comprises a prediction loop for forming a motion-compensated prediction picture. This loop comprises an inverse quantizer 25, an inverse picture transformer 26, an adder circuit 27, a picture memory 28 and a motion estimator 29.

It is to be noted that not every coefficient of a block is necessarily quantized with the same step size. The quantization step may also depend on the spatial frequency represented by a coefficient. In that case, the expression "step size" is understood to mean a parameter fixing the distinct quantization steps for a block of coefficients.

The obtained series of code words of variable length constitutes a quantization-dependent bit stream $q_1$ of coefficient bits. This bit stream is combined in a multiplexer 3 with other information which is formed, inter alia by motion vectors produced by motion estimator 29. The other information will hereinafter be referred to as "overhead" and is denoted by $v_1$ in the Figure. The combined bit stream is applied to a buffer 4 from which it is read at a channel bitrate $f_{ch}$.

The device has hitherto constituted a known MPEG encoder as described in the afore-mentioned document "Coding of moving pictures and associated audio for digital storage media up to about 1.5 Mbit/s". The video signal is transmitted in the form of groups of pictures (GOPs). Each GOP comprises at least one intraframe-encoded picture (I picture), a number of predictively encoded pictures (P pictures) and a number of bidirectionally predictively encoded pictures (B pictures). When encoding I pictures, the subtracter 21 is not active and each block of pixels is encoded individually. For P and B pictures, the motion estimator 29 supplies a prediction block and a difference block is encoded. If there is insufficient conformity between a block of the supplied picture and its ambience in prediction picture memory 28 (i.e. when there is too much motion), blocks of P and B pictures may also be subjected to intraframe encoding. Information with respect to the applied encoding mode of a block is also accommodated in the overhead information $v_1$.

In accordance with the invention, the device further comprises an additional encoder 8 and a computing circuit 9 coupled thereto for computing a "global target value" for the number of bits for encoding the picture. The additional encoder 8 will hereinafter also be referred to as preanalyser. It forms a quantization-dependent bit stream $q_2$ and overhead information $v_2$. The preanalyser may have different forms. It will hereinafter be assumed to be an MPEG encoder without bitrate control. The preanalyser is then of the same type as encoder 2 and therefore it is not shown in greater detail. It receives a quantization step size $Q_2$ from a step size determining circuit 11 which will be described hereinafter. However, it should already be noted that the step size $Q_2$ is invariable during a picture but may be different from picture to picture.

Figure 2:
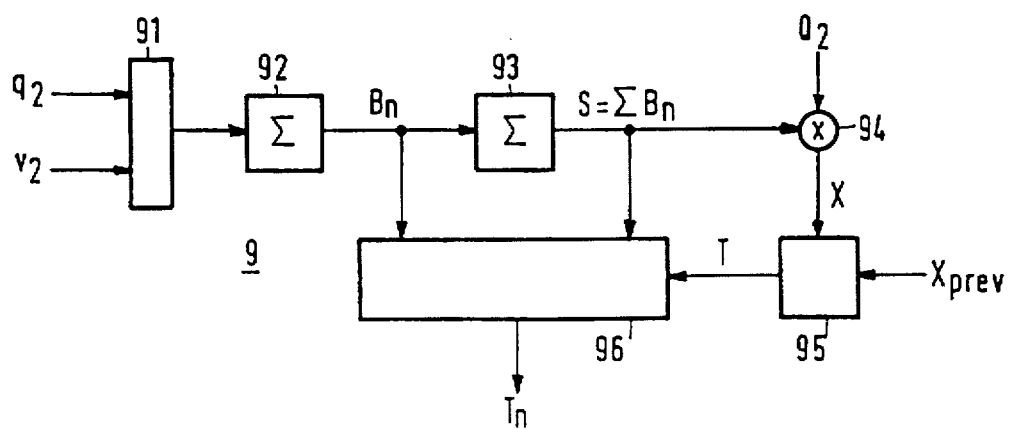
FIGS. 2 and 3 show embodiments of a computing circuit shown in FIG. 1.

FIG. 2 shows diagrammatically an embodiment of the computing circuit 9. It comprises a multiplexer 91 for combining the coefficient bit stream $q_2$ and the overhead bit stream $v_2$ which is produced by the preanalyser. The combined bit stream is applied to a counter 92 which counts the number of bits $B_n$ generated by the preanalyser for subpicture n of the picture. A further counter 93 counts the total number of bits $S=\Sigma B_n$ which is spent on the entire picture. S is multiplied by the step size $Q_2$ in a multiplier 94. The product is a complexity value X which is representative of the complexity of the applied picture. Said complexity value is separately determined for each type of picture (I, P, B). Expressed in a formula:

$$X_I=S_I \times Q_{2I},\ X_P=S_P \times Q_{2P}\ \text{and}\ X_B=S_B \times Q_{2B} \tag{1}$$

The complexity value is applied to the computing circuit 95 for computing the global target value T. The following considerations apply with respect to the computations performed by the computing circuit:

(A) A total number of bits R is available for a GOP comprising $N_I$ pictures of the type I, $N_P$ pictures of the type P and $N_B$ pictures of the type B. The aim is to distribute the global target values $T_I$, $T_P$, $T_B$ for each type of picture in such a way that:

$$R=N_I \cdot T_I+N_P \cdot T_P+N_B \cdot T_B \tag{2}$$

is satisfied.

(B) It is assumed that the different encoding types (I, P, B) lead to an equal picture quality if the corresponding step sizes $Q_I$, $Q_P$ and $Q_B$ are in a given ratio:

$$Q_P=k_p \cdot Q_I\ \text{and}\ Q_B=k_b \cdot Q_I \tag{3}$$

The relation between the number of bits $S_P$, $S_B$ obtained in P and B encoding of a picture and the number of bits $S_I$ obtained in I encoding of this picture can be derived from (1) and (3):

$$S_P=\frac{X_P}{k_p \cdot X_I} S_I\ \text{and}\ S_B=\frac{X_B}{k_b \cdot X_I} S_I$$

(C) The same relation is assumed to be applicable to the global target values for the different types of pictures:

$$T_P=\frac{X_P}{k_p \cdot X_I} T_I\ \text{and}\ T_B=\frac{X_B}{k_b \cdot X_I} T_I \tag{4}$$

The following formula for the global target value $T_I$ for an I picture can be derived from (2) and (4):

$$T_I = \frac{R}{N_I + \frac{N_P \cdot X_P}{k_p \cdot X_I} + \frac{N_B \cdot X_B}{k_b \cdot X_I}} \quad (5)$$

(D) After the global target value $T_I$ for the last (or only) I picture of the GOP is fixed and the picture is encoded as much as possible in conformity therewith, the target values for the other P and B pictures may be adapted, if desired, to the remaining number of bits available for the GOP. In that case, equation (2) changes to:

$$R_I = n_P \cdot T_P + n_B \cdot T_B$$

in which $n_P$ and $n_B$ represent the number of P and B pictures still to be encoded in the GOP and $R_I$ represents the number of bits which is still available. The following formulas can now be derived for the target values $T_P$ and $T_B$:

$$T_P = \frac{R_I}{n_P + \frac{n_B \cdot k_p \cdot X_B}{k_b \cdot X_P}} \text{ and} \quad (6)$$

$$T_B = \frac{k_p \cdot X_B \cdot T_P}{k_b \cdot X_P}$$

The global target value of a picture is computed by the computing circuit 95 before the relevant picture is applied via a picture delay 10 to encoder 2 (see FIG. 1) for actual encoding. The computation is effected as follows:

(I) During encoding of an I picture, the computing circuit receives the complexity value $X_I$ of this picture from multiplier 94. The target value $T_I$ is computed by means of equation (5). The complexity values $X_P$ and $X_B$ in this equation are formed by previously computed complexity values of the most recent previous P or B picture. These previously computed complexity values are denoted by $X_{prev}$ in FIG. 2. They are stored in a memory (not shown) upon encoding of the previous picture.

(P) During encoding of a P picture, computing circuit 95 receives the complexity value $X_P$ of this picture from multiplier 94. The target value $T_P$ is computed by means of equation (4) or, if the GOP no longer comprises any further I pictures, by means of equation (6). The complexity values other than $X_P$ are again formed by the previously computed complexity values of the most recent previous picture of the relevant type.

(B) During encoding of a B picture, computing circuit 95 receives the complexity value $X_B$ of this picture from multiplier 94. The target value $T_B$ is computed by means of equation (4) or (6).

A distribution circuit 96 subsequently distributes the global target value T among the macroblocks of the picture. To this end, the distribution circuit computes a "local target value" $T_n$ for each macroblock n. In a simple embodiment, the distribution circuit distributes the target value T evenly among all N macroblocks of the picture. Expressed in a formula:

$$T_n = T/N$$

However, the local target value $T_n$ for each macroblock is preferably proportional to the number of bits $B_n$ produced for these macroblocks by the preanalyser. Expressed in a formula:

$$T_n = \frac{B_n}{\Sigma B_n} \times T \quad (7)$$

The local target value for a macroblock is now in conformity with the relative complexity of this macroblock. Thus, it is, as it were, "foreseen" that more bits are spent on a sub-picture as this sub-picture is more detailed. This yields a uniform picture quality throughout the picture.

Figure 3:
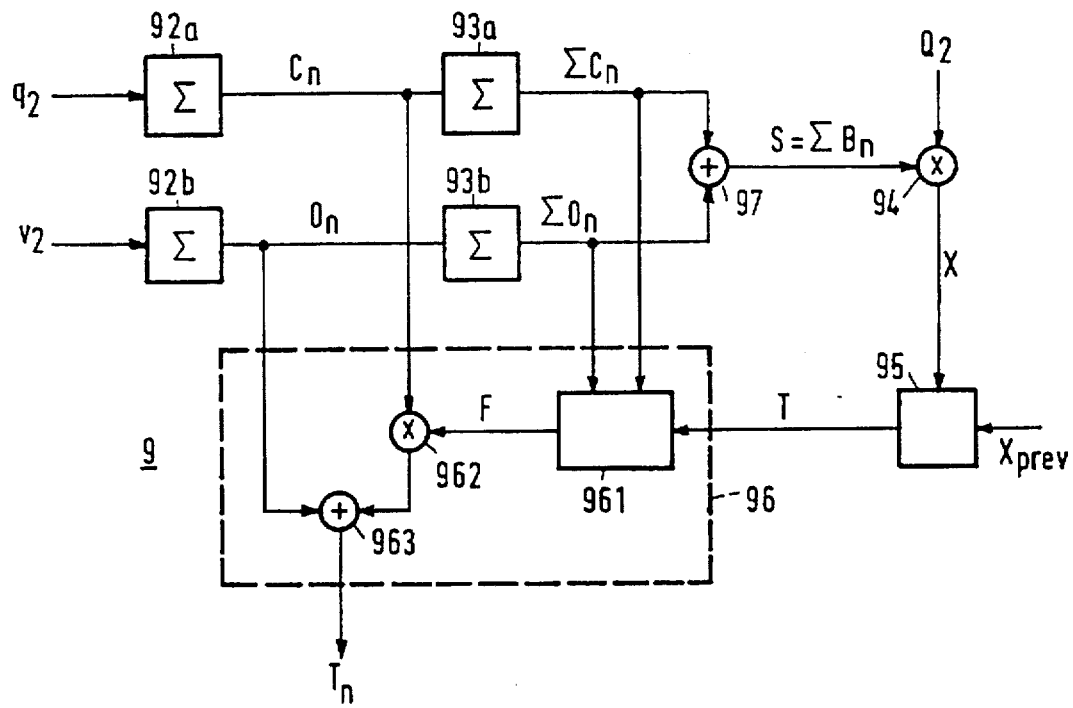

FIG. 3 shows a further embodiment of the computing circuit 9. In this embodiment, the number of coefficient bits and the number of overhead bits of the preanalyser is separately counted for each macroblock n. To this end, the computing circuit comprises separate counters 92a and 92b for counting, macroblock by macroblock, the number of coefficient bits $C_n$ in the quantization-dependent bit stream $q_2$ and the number of bits $O_n$ in the overhead data $v_2$. Further counters 93a and 93b count the number of bits $\Sigma C_n$ and $\Sigma O_n$ throughout the picture. An adder 97 sums both numbers so that the total number of bits $S = \Sigma B_n$ is obtained again, which is spent by the preanalyser on the entire picture. In the manner already described with reference to FIG. 2, multiplier 94 fixes the complexity value X of the applied picture and computing circuit 95 computes the global target value for the picture.

The distribution circuit 96 now has a different structure than that in FIG. 2. It comprises a scaling circuit 961 fixing a scale factor F in conformity with the following formula:

$$F = \frac{T - \Sigma O_n}{\Sigma C_n}$$

The local target value $T_n$ is subsequently obtained by multiplying, for each macroblock n the number of coefficient bits $C_n$ by the scale factor F (multiplier 962) and adding the number of overhead bits $O_n$ thereto (adder 963). In other words, in this embodiment, the local target value $T_n$ for each macroblock is determined by the formula:

$$T_n = F \times C_n + O_n \quad (8)$$

The target value in accordance with equation (8) is more suitable than that in accordance with equation (7) because it is then avoided that too many bits of a macroblock are spent on overhead data. This will be elucidated by way of an example. In this greatly simplified example, a picture comprises two macroblocks. The global target value for the complete picture is T=250 bits. The preanalyser has produced 500 bits for the picture in the following way:

|  | coefficient bits | overhead bits |
|---|---|---|
| macroblock 1 | 325 | 75 |
| macroblock 2 | 50 | 50 |

In the embodiment of FIG. 2, the local target values $T_1 = 200$ and $T_2 = 50$ are obtained in conformity with equation (7). Based on the (real) assumption that the encoder produces as many overhead bits as the preanalyser, this results in:

|  | coefficient bits | overhead bits |
|---|---|---|
| macroblock 1 | 125 | 75 |
| macroblock 2 | 0 | 50 |

In the embodiment of FIG. 3, the local target values $T_1 = 183$ and $T_2 = 67$ are obtained in conformity with equation (8) (in which F=0.33). The encoder now produces:

|  | coefficient bits | overhead bits |
|---|---|---|
| macroblock 1 | 108 | 75 |
| macroblock 2 | 17 | 50 |

The distribution of the global target value among the macroblocks in accordance with the embodiment shown in FIG. 3 thus yields a more uniform picture quality than the embodiment shown in FIG. 2.

Figure 4:
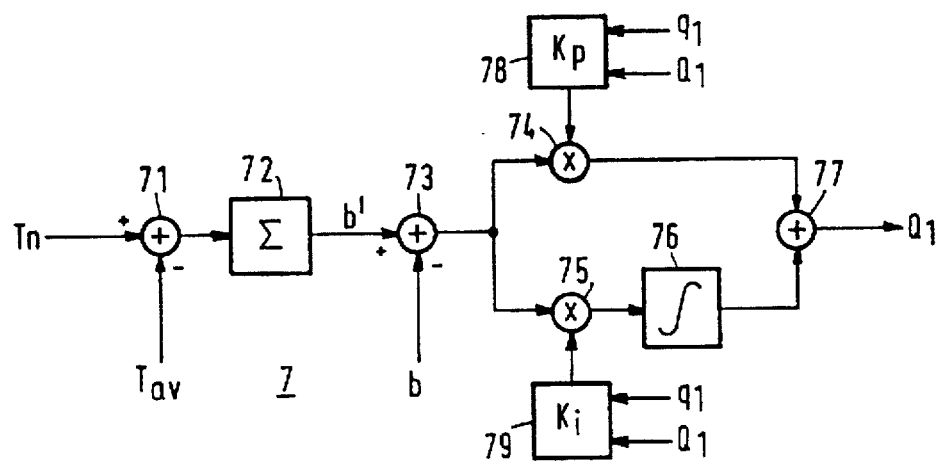
FIG. 4 shows an embodiment of a control circuit shown in FIG. 1.

The target values $T_n$ are applied to the control circuit 7 (see FIG. 1). FIG. 4 shows a possible embodiment of this control circuit. It comprises a subtracter 71 which determines, for each macroblock, the difference between the local target value $T_n$ and a desired average value $T_{av}$. $T_{av}$ has a fixed value which directly follows from the number of bits R per GOP, the number of pictures in a GOP and the number of macroblocks per picture. The obtained difference is accumulated by means of a counter 72. The output signal of the counter 72 forms, as it were a desired packing density b' (in number of bits) of the output buffer. 4 (see FIG. 1) of the device. The control circuit further comprises a subtracter 73 in which the desired packing density b' is compared with the actual packing density b of the buffer. The difference between the two numbers of bits constitutes a control signal. Said control signal is multiplied by a first multiplier 74 by a control factor $K_p$ and by a second multiplier 75 by a control factor $K_i$. The output of the second multiplier 75 is applied to an integrator 76. An adder 77 adds the outputs of multiplier 74 and integrator 76.

The elements 74-77 of the control circuit shown in FIG. 4 constitute a proportionally integrating (PI) controller which controls the step size $Q_1$ for supply to encoder 2 (see FIG. 1) without producing a residue in the control signal. Tests have proved that the desired number of bits R for each GOP can be achieved with the device within an accuracy of 0.03%. The output signal of the device is therefore eminently suitable for storage, allowing the facility of later editing.

Figure 5:
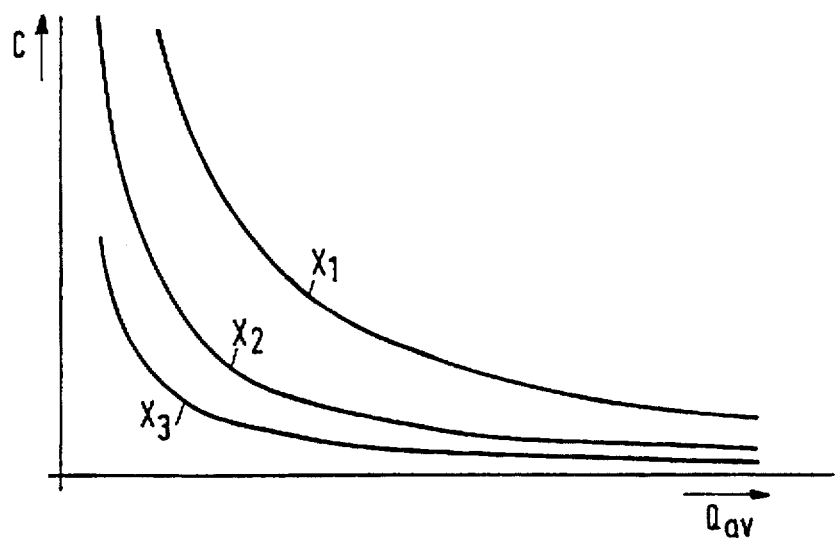
FIG. 5 shows a diagram to explain the operation of the control circuit shown in FIG. 4.

The control factors $K_p$ and $K_i$ may be constants. An MPEG encoder may, however, be considered as a process having a non-constant gain. To explain this, FIG. 5 shows the relation between the number of coefficient bits C and the average step size Q for three different pictures of complexity X=C.Q. The derivative dC/dQ is a measure of the gain of the MPEG encoder. More particularly, the gain of an encoder can be defined as:

$$G = \frac{dC}{dQ} = \frac{-X}{Q^2} = \frac{-C}{Q}$$

As is apparent from the Figure, the gain does not only depend on the complexity X (hence on the picture contents) but also on the step size Q. Constant control factors $K_p$ and $K_i$ are to be dimensioned in such a way that there is no instability of the control process, even for the most complicated signals.

The control process is stable under all circumstances when variations in gain are compensated by inverse variations in the control factors, in other words, when the product of control factor and gain is constant. Hence, favourable control factors $K_p$ and $K_i$ are constituted by:

$$K_p = \frac{-c_p}{G} = \frac{c_p \cdot Q}{C} \text{ and } K_i = \frac{-c_i}{G} = \frac{c_i \cdot Q}{C}$$

in which $c_p$ and $c_i$ are appropriate constants. The elements denoted by 78 and 79 in FIG. 4 are adapted to generate the control factors $K_p$ and $K_i$, respectively, in conformity therewith. To this end, they receive the bit stream $q_1$ from the encoder (for deriving the number of produced bits therefrom) as well as the step size $Q_1$.

Figure 6:
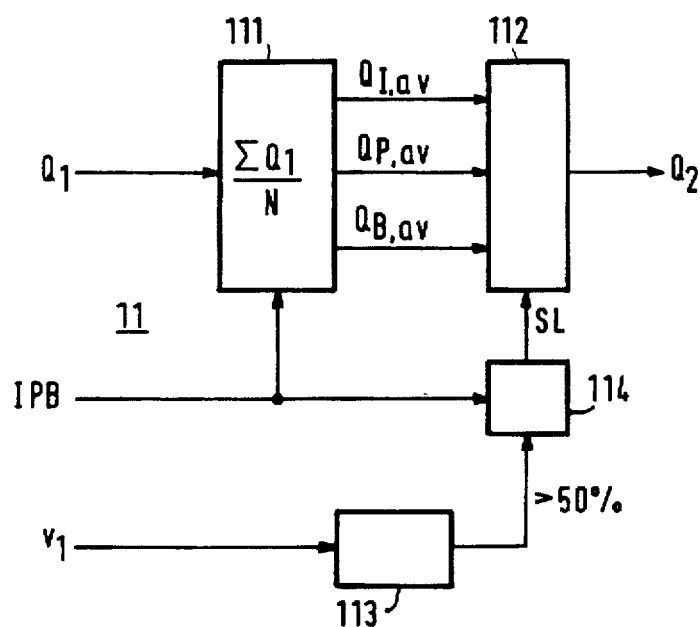
FIG. 6 shows an embodiment of a step size determining circuit shown in FIG. 1.

FIG. 6 shows a possible embodiment of the step size determining circuit 11 which generates the "fixed" step size $Q_2$ for the preanalyser 8 (see FIG. 1). It comprises a circuit 111 which determines the average step size $Q_{I,av}$, $Q_{P,av}$ and $Q_{B,av}$ for each type of (I, P, B) picture, with which this picture is quantized by encoder 2. In a simple but useful embodiment of the device, the average step size $Q_{P,av}$ is applied for each picture to the preanalyser. Also after changes of scenes, this choice yields an adequate estimation of the complexity of the picture. In an alternative embodiment the preanalysis of an I, P and B picture is performed with the average step size $Q_{I,av}$, $Q_{P,av}$ and $Q_{B,av}$, respectively. To this end, the step size determining circuit comprises a selector 112 with which the relevant average step size is selected in response to a selection signal SL. After a change of scenes, however, the preanalysis of the next I picture is performed with the average step size $Q_{P,av}$. In fact, changes of scenes are considered to have occurred if more than one predetermined number of macroblocks of a P picture insufficiently resembles the prediction picture. To this end, a scene change detector 113 receives the overhead bit stream $v_1$, counts the number of intraframe-encoded macroblocks in P pictures and determines whether this number is more than, for example 50%. A control circuit 114 receives the detection signal as well as the picture type (I, P, B) and supplies the selection signal SL. The step size $Q_2$ is now dependent on picture type and change of scenes as follows:

| >50% | type | $Q_2$ |
|---|---|---|
| 0 | I | $Q_{I,av}$ |
| 1 | I | $Q_{P,av}$ |
| — | P | $Q_{P,av}$ |
| — | B | $Q_{B,av}$ |

We claim:

1. A device for encoding a video signal as a group of pictures including at least one independent picture (I) and a plurality of motion-compensated differential pictures (P, B), said group of pictures being encoded using substantially a desired number of bits, comprising:

means for dividing each picture of said group into a plurality of sub-pictures;

an encoder for selectively encoding independent pictures (I) of said group and motion-compensated pictures (P, B) of said group, the encoder comprising a picture transformer for transforming each said sub-picture into coefficients, and a quantizer for quantizing the coefficients using an applied quantization step size;

an additional encoder for encoding each said picture of said group in accordance with its type (I, P, B) using a fixed quantization step size;

computing means for computing a target value (T) for the number of bits to be produced by said encoder for each said picture in dependence upon the number of bits produced by said additional encoder for each said picture, the type (I, P, B) of said picture, and said desired number of bits for said group of pictures; and control means for controlling said applied quantization step size in accordance with said target value (T), whereby said group of pictures is encoded by said encoder with substantially said desired number of bits.

2. The device as claimed in claim 1, wherein said fixed quantization step size comprises an average quantization step size with which a previous P picture has been encoded.

3. The device as claimed in claim 1, wherein said fixed quantization step size comprises an average quantization step size with which a previous picture of the same type (I, P, B) has been encoded.

4. The device as claimed in claim 3, wherein said fixed quantization step size for the first I picture following a change of scenes comprises the average quantization step size with which a previous P picture has been encoded.

5. The device as claimed in claim 1, wherein said computing means comprise a distribution circuit for proportionally distributing said target value (T) among local target values ($T_n$) for each sub-picture in proportion to the number of bits generated for said sub-pictures by said additional encoder, said control means being adapted to control said applied quantization step size in accordance with the local target value ($T_n$) for each sub-picture.

6. The device as claimed in claim 5, wherein a series of quantization-dependent and a series of quantization-independent bits are formed for each sub-picture, wherein said distribution circuit is adapted to distribute said target value (T) among said sub-pictures in proportion to the number of quantization-dependent bits generated for said sub-pictures by said additional encoder.

7. The device as claimed in claim 5, wherein said control means comprises means for forming a control signal which is representative of the difference between the cumulative target values ($T_n$) for each sub-picture and the number of bits produced by said encoder, and a proportionally integrating control circuit to which said control signal is applied.

* * * * *